United States Patent [19]

Schlademan

[11] Patent Number: 4,551,388
[45] Date of Patent: Nov. 5, 1985

[54] ACRYLIC HOT MELT PRESSURE SENSITIVE ADHESIVE COATED SHEET MATERIAL

[75] Inventor: James A. Schlademan, West Chester, Pa.

[73] Assignee: Atlantic Richfield Company, Los Angeles, Calif.

[21] Appl. No.: 508,298

[22] Filed: Jun. 27, 1983

[51] Int. Cl.$^4$ .................. C09J 3/00; C08F 265/04
[52] U.S. Cl. .................... 428/355; 428/483; 428/508; 428/510; 428/514; 428/516; 428/518; 428/520; 525/292; 525/309
[58] Field of Search ............... 428/483, 510, 508, 516, 428/518, 520, 355, 514

[56] References Cited

U.S. PATENT DOCUMENTS 3,558,746 1/1971 Sliwka et al. .................. 260/885

FOREIGN PATENT DOCUMENTS 0104046 3/1984 European Pat. Off. .

OTHER PUBLICATIONS

Yamashita, "Synthesis & Characterization of Functional Graft Copolymers by Macromonomer Technique", *J. Applied Polymer Science*, 1981, pp. 193–199.

*Primary Examiner*—Patrick C. Ives
*Attorney, Agent, or Firm*—Lewis J. Young

[57] ABSTRACT

Acrylic pressure sensitive hot melt adhesives having improved creep resistance at ambient temperatures and desirable melt viscosity at elevated application temperatures are prepared by copolymerizing suitable acrylic and methacrylic acids and alkyl esters with 10-40 percent by weight of an acrylate or methacrylate terminated vinyl aromatic monomer based macromolecular monomer. The adhesives are coated onto flexible backing material to form labels, decals, tapes, and other sheet materials.

4 Claims, No Drawings

ACRYLIC HOT MELT PRESSURE SENSITIVE ADHESIVE COATED SHEET MATERIAL

BACKGROUND OF THE INVENTION

Acrylic hot melt pressure sensitive adhesives are useful in the production of tapes, labels, and decals having superior weathering and solvent resistance to similar adhesives prepared from conventional styrene/diene block copolymers. The ability of these adhesives to be applied from the melt and their excellent creep resistance gives them significant performance and processing advantages over conventional solvent and emulsion based acrylic pressure sensitive adhesives.

Previous attempts to product hot melt acrylic pressure sensitive adhesives have involved the blending of high and low molecular weight acrylic polymers having carefully selected compatibility characteristics. These efforts have failed to produce an adhesive with the desired balance of adhesive and cohesive properties coupled with molten viscosities suitable for practical hot melt applications. Davis et al, in U.S. Pat. No. 3,925,282, discloses a system which incorporates a tertiary amine containing monomer in the tacky acrylic polymer followed by reaction of this polymer with a heavy metal containing compound. The use of heavy metals is undesirable, however, from the standpoint of product toxicity and no molten viscosities are given for their examples.

The preparation of macromolecular monomers and their copolymerization with acrylates is described in U.S. Pat. No. 3,786,116, by Milkovich et al. However, the patent does not teach the use of this technique for the preparation of the novel adhesive compositions described in the present invention.

SUMMARY OF THE INVENTION

I have now discovered that acrylic hot melt pressure sensitive adhesives can be prepared by copolymerizing a vinyl aromatic monomer macromolecular monomer with alkyl acrylate esters, or, optionally, mixtures of alkyl acrylate esters and acrylic acids or acrylamides. The polymerization is carried out in an organic solvent using a free radical initiator. Upon completion of the polymerization, removal of the solvent results in a tacky acrylate copolymer having a good balance of tack and shear adhesion properties and a molten viscosity at 350° F. of less than about 250,000 cps. making the polymer suitable for use on conventional hot melt coating equipment to form coated sheet material having a flexible backing.

DESCRIPTION OF THE INVENTION

The invention comprises pressure-sensitive adhesive coated sheet material comprising a flexible backing having a coating of a thermoplastic graft copolymer of (a) 10–40 percent by weight, based on graft copolymer, of a macromolecular monomer consisting of poly(vinyl aromatic monomer) of number average molecular weight between 5000 and 50,000 terminated with ethylene oxide and subsequent reaction with acryloyl or methacryloyl chloride to form terminal acrylate or methacrylate groups, and (b) 60–90 percent by weight, based on graft copolymer, of one or more monomers selected from the group consisting of acrylic acid, acrylamide, methacrylic acid, methacrylamide, and alkyl acrylates having 1–10 carbon atoms in the alkyl groups, whereby the terminal acrylate or methacrylate groups of said macromolecular monomer (a) are addition copolymerized with the monomer of monomer (b) to produce a graft copolymer having pendant poly(vinyl aromatic monomer) groups.

The thermoplastic graft copolymers useful for the present invention are preferably those prepared by the process taught in U.S. Pat. No. 3,786,116, issued to CPC International, wherein a macromolecular monomer is first prepared, and then the macromolecular monomer is copolymerized with one or more monomers selected from the group consisting of acrylic acid, acrylamide, methacrylic acid, methacrylamide, and alkyl acrylates where the alkyl groups may contain from 1 to 10 carbon atoms.

The macromolecular monomer may be prepared from any monomer polymerizable by anionic initiators to form a polymer whose Tg is between 30° to 150° C. and whose polymer is incompatible with polyacrylates. The preferred monomer is one of the vinyl aromatic monomers such as styrene, alpha-methylstyrene, nuclear-methylstyrene, indene, and p-tert-butylstyrene.

The macromolecular monomers of special interest are made by polymerizing styrene with an alkyl lithium initiator to a polystyrene of number average molecular weight between 5,000 and 50,000, preferably between 9,000 and 35,000, and then capping the polystyryl chains with first an alkylene oxide and then an acrylate or methacrylate group. It is the acrylate or methacrylate group which copolymerizes with the alkyl acrylates.

The alkyl acrylates useful in the invention are those whose alkyl groups contain from 1 to 10 carbon atoms. These include methyl acrylate, ethyl acrylate, propyl acrylate, isopropyl acrylate, the four butyl acrylates, the amyl acrylates, the hexyl acrylates, the 2-ethylhexyl and other octyl acrylates, the nonyl acrylates, and the decyl acrylates.

The thermoplastic graft copolymers are prepared by copolymerization of the macromolecular monomer with one or more monomers selected from the group consisting of acrylic acid, acrylamide, methacrylic acid, methacrylamide, and the alkyl acrylates by conventional free-radical initiated copolymerization techniques. The preferred copolymers are prepared by copolymerizing 10 to 40 percent by weight, based on graft copolymer, of the macromolecular monomer with 60 to 90 percent by weight, based on graft copolymer, of the one or more monomers, as taught in U.S. Pat. No. 3,786,116. The resultant copolymer consists of an acrylate backbone with polystyrene chains grafted to the backbone. The copolymerization proceeds according to known relationships based on the relative reactivities of the monomers as derived from standard copolymerization texts. The temperature of copolymerization may vary from 20° C. to about 150° C. for periods of time from 2-24 hours or until conversion reaches about 95% or greater.

The suitable flexible backing materials are well known in the pressure sensitive adhesive field. These include creped paper, kraft paper, cloth, wadding, foil, and polymer films. Notable polymer films include polyethylene, oriented polypropylene, polyvinyl chloride, poly(ethylene terephthalate), poly(hexamethylenediamine adipate), cellophane, cellulose acetate, and plasticized poly(vinyl acetate-co-vinyl chloride).

The adhesive coatings of the present invention can be applied to the flexible backing material as a solution and the solvent subsequently removed to leave a tacky coating on the backing. However, the preferred adhesives can be applied from the melt directly to the backing, allowing a more efficient one-step application to moving rolls of backing to directly form the coated sheet material.

The following examples are given to further illustrate the invention, but are not intended to be all inclusive. All percentages are weight percent unless otherwise indicated.

EXAMPLE I a. Preparation of Polystyrene Terminated with Methacryloyl Chloride

A glass and stainless steel reactor was charged with 1100 grams of cyclohexane, pre-dried over molecular sieves, and 400 grams of styrene purified over activated alumina. The reactor temperature was raised to 70° C. and s-butyllithium solution (1.4M in cyclohexane) was slowly added until a persistant light reddish-orange color was obtained. An additional 100 ml (0.140 moles) of s-butyllithium was immediately added. Styrene was then pumped into the reactor for 30 minutes until a total of 1680 grams had been added. The temperature was maintained at 70° C. for 30 minutes and then 12.3 grams of ethylene oxide (0.28 moles) was added causing the solution to become colorless. To the resulting solution was added 16.1 grams (0.154 moles) of methacryloyl chloride to give a macromolecular monomer of 12,000 molecular weight, measured by GPC, having the following structural formula:

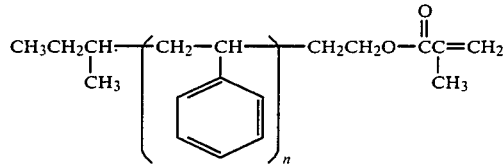

where n has a value such that the molecular weight is 12,000.

b. Preparation of Macromolecular Monomer/Acrylate Copolymer

A resin kettle fitted with a condenser, thermometer, dropping funnel and stirrer was charged with 200 grams of methyl ethyl ketone and heated to reflux. A mixture of 150.0 grams of 2-ethyhexyl acrylate, 50.0 grams n-butyl acrylate, 83.3 grams of the macromolecular monomer solution from Example 1a (50.0 grams dry weight), and 1.00 grams to azobisisobutyronitrile initiator was then added to the refluxing MEK over 30 minutes and the resulting solution held at reflux for 2 hours. Upon completion, the polymer solution had a total solids content of 50.4% (theoretical: 51.7%). Removal of the solvent under vacuum gave a clear tacky polymer having an apparent GPC peak molecular weight (polystyrene standard) of 90,500.

EXAMPLES 2-7

A series of polymerizations were carried out in the same manner as Example 1. The results and adhesive test data appear in Table 1. Examples 5-7 contain no macromolecular monomer and serve as controls.

The data show that, to obtain good shear adhesion (cohesive strength) in a straight acrylate polymer, molecular weights well in excess of 100,000 are required. This is true even when an acid such as methacrylic acid is added. Copolymerization with the methacrylate-terminated polystyrene, however, gives good tack and shear values and molten viscosities well below 100,000 cps.

TABLE 1
Acrylic Hot Melt Pressure Sensitive Adhesives

| | Charge Composition, wt. % | | | | Polymer Data | | Adhesive Performance[1] | | |
|---|---|---|---|---|---|---|---|---|---|
| Example | S12MA[2] | Methacrylic Acid | n-Butyl Acrylate | 2-ethylhexyl Acrylate | Conversion % | Molecular[3] Weight × 10$^{-3}$ | Polyken[4] Probe Tack, g | Shear[5] Adhesion min. | Viscosity[6] @ 350° F. cps × 10$^{-3}$ |
| 1 | 20 | 0 | 20 | 60 | 97.4 | 90.5 | 724 | >4000 | 6.0 |
| 2 | 15 | 0 | 21.2 | 63.8 | 96.9 | 69.3 | 1006 | 124 | 4.2 |
| 3 | 15 | 10 | 18.8 | 56.2 | 96.1 | 58.7 | 92 | >4000 | 32.0 |
| 4 | 33 | 0 | 16.8 | 50.2 | 97.7 | 101.4 | 0 | >4000 | 13.5 |
| 5 | 0 | 0 | 25 | 75 | 99.0 | 114.5 | 404 | 0.2 | 0.4 |
| 6 | 0 | 0 | 25 | 75 | 94.0 | 796.4 | 846 | 2.5 | 180 |
| 7 | 0 | 10 | 20 | 70 | 107.0 | 295.0 | 376 | 2469 | 170 |

[1]Adhesion test strips prepared by coating polymer from solution onto 2 mil mylar sheet at dry coating thickness of 1.0 to 1.5 mil.
[2]Methacrylate terminated polystyrene macromolecular monomer from Example 1.
[3]GPC peak molecular weight using polystyrene standards.
[4]ASTM D-2979 Dwell time = 5 sec. Probe speed = 1 cm/sec.
[5]PSTC-7 1 kg. weight 1 × 1 inch area to stainless steel.
[6]Brookfield Thermosel.

We claim:

1. Pressure-sensitive adhesive coated sheet material comprising a flexible backing having a coating of a thermoplastic graft copolymer of (a) 10-40 percent by weight, based on graft copolymer, of a macromolecular monomer consisting of poly(vinyl aromatic monomer) made by polymerization of vinyl aromatic monomer with an alkyllithium initiator to a poly(vinyl aromatic monomer) of number average molecular weight between 5000 and 50,000 capping with alkylene oxide and subsequent reaction with acryloyl or methacryloyl chloride to form terminal acrylate or methacrylate groups, and (b) 60-90 percent by weight, based on graft copolymer, of one or more monomers selected from the group consisting of acrylic acid, acrylamide, methacrylic acid, methacrylamide, and alkyl acrylates having 1-10 carbon atoms in the alkyl groups, whereby the terminal acrylate or methacrylate groups of said macromolecular monomer (a) are addition copolymerized with the monomer of monomer (b) to produce a graft copolymer having pendant poly(vinyl aromatic monomer) groups.

2. The coated sheet material of claim 1 wherein said poly(vinyl aromatic monomer) is polystyrene.

3. The coated sheet material of claim 1 wherein said flexible backing is selected from creped paper, kraft paper, cloth, wadding, foil, or polymer film.

4. The coated sheet material of claim 3 wherein said polymer film is selected from polyethylene, oriented polypropylene, polyvinylchloride, poly(ethylene terephthalate), poly(hexamethylenediamine adipate), cellophane, cellulose acetate, and plasticized poly(vinyl acetate-co-vinyl chloride).

* * * * *